March 14, 1950 DE WITT S. CROCKER Re. 23,205

CURB INLET CASTING

Original Filed June 14, 1945

INVENTOR
De Witt Clayton Crocker
BY
William S. Grant
ATTORNEY 45-59

Reissued Mar. 14, 1950

Re. 23,205

UNITED STATES PATENT OFFICE 23,205

CURB INLET CASTING

De Witt Saxton Crocker, Springfield Gardens, N. Y.

Original No. 2,473,279, dated June 14, 1949, Serial No. 599,415, June 14, 1945. Application for reissue September 24, 1949, Serial No. 117,521

6 Claims. (Cl. 182—6)

Matter enclosed in heavy brackets [ ] appears in the original patent but forms no part of this reissue specification; matter printed in italics indicates the additions made by reissue

This invention relates to curb inlets for catch basins for road drainage.

Such inlets are provided by incorporating into the curb which separates the elevated sidewalk from the road, a casting which opens the road gutter to a catch or drainage concrete lined basin which underlies the sidewalk. The casting is held in position by being bonded to the immediately adjacent portions of such construction. Experience has proven that this bond is an element of weakness in that it breaks readily and permits the casting to move away from the sections to which it has been bonded. It is not an unusual occurrence for the casting to project outwardly beyond the curb as much as 4", to present a hazardous obstruction to traffic. I attribute this weakness to the peculiarity that the concrete sections to which the casting is bonded do not contract as fully as they expand. This explains the gradual decrease in the width of the separating spaces generally provided between sections of a roadbed for expansion, until the space closes and any further expansion of the roadbed sections will cause the road to break up. This is a major determining factor in the life of the roadbed.

It is this peculiarity in the contraction and expansion of the sections, coupled with the fact that the curb inlet casting tends not to follow the contraction and expansion of the sections to which it is bonded or secured, which in my opinion destroys this bond so that the curb requires frequent rebuilding and the casting resetting during the life of the road, with the consequent inconvenience and increase in road maintenance cost.

The general object of my invention is a novel provision for preventing the separation of the curb inlet casting from the catch basin wall structure.

Another object of my invention is a novel provision for so securing the curb inlet casting to the catch basin wall structure that the inlet casting will move therewith as the wall structure expands and contracts with temperature changes and will remain fixedly bonded thereto and inseparable therefrom as long as the wall structure maintains its integrity.

For the attainment of these objects and such other objects as will be hereinafter pointed out, I have illustrated embodiments of my invention in the drawings, wherein.

Figure 1:
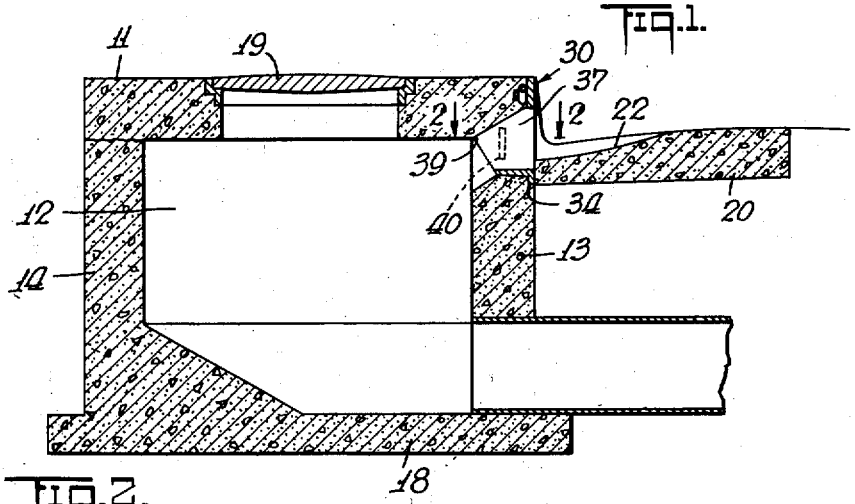
Fig. 1 is a cross-section through a catch basin, the sidewalk which it underlies, and the adjacent gutter slab.
Figure 2:
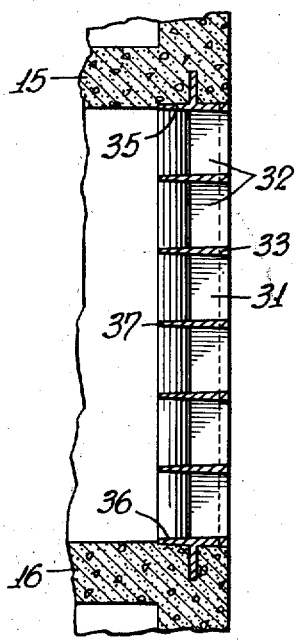
Fig. 2 is a section taken on line 2—2 of Fig. 1, on an enlarged scale.

Upon reference to Fig. 1, it will be observed that I here show a transverse cross-section through the gutter slab 20 and the adjacent sidewalk 11 which overlies the catch or drainage basin 12 whose front and back and side walls are numbered 13, 14, 15 and 16, respectively, and whose bottom is numbered 18. Access to basin 12 may be had through a sidewalk opening closed by manhole cover 19. The inner portion of the gutter slab 20 tapers to provide a gutter 22 into which the water drains from the roadway and along which it flows to the curb inlet and from there into the basin 12.

The curb inlet casting is shown as comprising a front wall 30 and a bottom 31. The front wall 30 is provided with relatively large openings 32 across its length, separated by relatively narrow partitions 33 to provide maximum drainage clearance therethrough. The partitions are extended rearwardly to form end walls 35 and 36 and the triangular fins 37 which define a plurality of passageways whose effect is to distribute the road water across the width of the basin 12. The fins 37 and the end walls 35 and 36 are shown for illustrative purposes, as all of the same dimensions and contours and as integral with the bottom 31 for its full depth. The front wall extends below the bottom 31 to provide the ledge 34. A conventional casting is approximately 16 to 17 inches high, and the rearmost apices 39 of the fins and side walls 35, 36 and 37 is approximately midway of the height of the casting and 8" to the rear of the front face.

Figure 3:
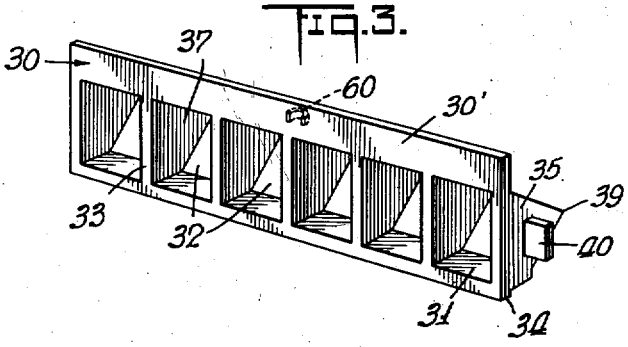
Fig. 3 is a perspective of the curb inlet casting of Figs. 1 and 2.
Figure 4:
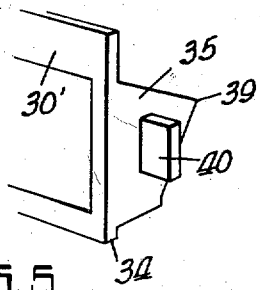
Fig. 4 is a perspective, on an enlarged scale, of the one end of the curb casting inlet of Fig. 3.

I provide the end walls 35 and 36 of the casting of Fig. 3 with [the outwardly extending and vertically elongated flanges 40, approximately 6" long and positioned centrally of the height and also of the depth of these walls.] *a pair of protuberances 40, 40 extending outwardly and generally longitudinally of the casting. The protuberances 40, 40 have a vertical dimension substantially centered at the juncture of the side walls 15, 16 and sidewalk slab 11 of the catch basin with the lower portions of protuberances 40, 40 embedded in said side walls 15, 16 and with the upper portions of the protuberances embedded in said sidewalk slab 11.*

I will now briefly set forth the functioning of my device by reference to a road building procedure. After sub-grading the dirt surface for the full width of the road including the sidewalk areas, and excavating for the catch or drainage basins 12, the inlet casting of Fig. 3 is suspended across the front of an excavation, from the subgrade to the sides thereof, with the bottom of the casting held approximately on the level with the sub-grade. Concrete is then poured to line the basin with concrete walls and bottom 13, 14, 15, 16 and 18 as shown in Fig. 1. The front wall is poured to the level of the bottom of the casting, i. e., the sub-grade level; whereas the other three walls are poured approximately to the level of the finished road surface which is 6" above the sub-grade and also the bottom of the casting. As a result, the front wall 13 will engage and bond to the bottom of the casting and the side walls 15 and 16 will engage the side walls 35 and 36 thereof approximately to the horizontal level of the apices 39 of these side walls and will embrace the lower half of the [flanges] *protuberances* 40.

Concrete or similar material is then poured for the sidewalk 11 which engages and overlies the tops of the three side walls 14, 15 and 16, and with the curb casting to close the basin except for the aforementioned front openings 32. It has already been pointed out that the side walls 15 and 16 were poured to a horizontal level of approximately the apices 39 of the triangularly formed rearwardly extending partitions. It therefore follows that the concrete or similar material which is poured to form the sidewalk 11 will engage the outer side faces of the end walls 35 and 36 of the casting and also the rear and side faces of the portion 30' of the front wall 30 which is above its openings 32. In this operation the upper half of the outwardly extending [lugs or flanges] *protuberances* 40 will be imbedded into and thus bonded to the sidewalk slab.

As a result of this arrangement, the casting is so bonded to the side walls 15 and 16 and the sidewalk 11 by the [flanges] *protuberances* 40 that any movement of that end of these walls or the sidewalk in contracting or expanding will carry the casting with it. The casting is thus retained against separation therefrom notwithstanding the aforementioned peculiarity in the expansion and contraction of these sections. The life of the bond between the curb inlet casting and the adjacent wall sections is thus increased probably to a longevity equal to that of the road itself and the aforementioned inconveniences and increased cost of road maintenance eliminated.

Figure 5:
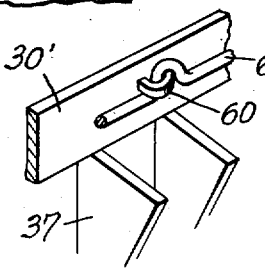
Fig. 5 shows a modification.

[The above procedure presupposes that the walls 13, 14, 15 and 16 are poured so that the bonding is effected as the concrete sets. It is, however, an occasional practice to build some of these sections of preformed blocks, in which event I prefer to use the alternative arrangement shown in Fig. 5 of the drawings, wherein a looped or hooked member 60 projects rearwardly from the rear surface of portion 30' of the front wall 30. When the sidewalk is poured, one of the reinforcing rods 61 which are generally embedded therein is bent through the hook or loop 60 as shown in this figure so that the casting is thus bonded to the sidewalk section.]

*As a result of the embedding of the protuberances 40, 40 in the side walls and sidewalk slab of the catch basin as described above, these and the front wall of the catch basin are integrally united together, so that all parts of the catch basin expand and contract together. Additionally, the curb inlet casting is bonded thereto and is prevented from moving relative to the catch basin.*

It will be understood that I may employ both the [lugs] *protuberances* 40 which project outwardly and oppositely from the side walls 35 and 36 and also the loop 60 where the walls are all poured, in which event the bond between the curb inlet casting and the adjacent walls will be strengthened to that extent.

What I claim as new and desire to secure by Letters Patent is:

1. An inlet casting comprising, a base, end walls extending upwardly from the ends and transversely of the length of the base to form the end walls of the casting, the outer faces of said end walls forming the end faces of the casting, spaced apart partition walls extending upwardly from the base transversely of its length to define a plurality of passageways intermediate the end walls to drain water from the road gutter into a basin beneath the sidewalk, a flange extending upwardly from and connecting the upper ends of said partition walls and end walls, the height of the flange being substantially greater than the thickness of the base, the front faces of the partition and end walls and the base being in a common plane and defining the front face of the casting, vertical lugs extending laterally outwardly from the end faces of the casting, the lugs being located to the rear of and below said flange and above the base whereby the concrete can be poured for the basin and the sidewalk by first pouring the basin to a level which is intermediate the top and bottom of the lugs and thereafter pouring the sidewalk slabs to that level.

2. A casting as set forth in claim 1, wherein the partition and end walls are extended rearwardly beyond the rear end of said base, said wall extensions being of a length no greater that the distance between the top of the base and the bottom of the flange, and being located therebetween and said lugs extending laterally outwardly from said extension of said end walls.

3. A casting as set forth in claim 2 wherein the thickness of the flange is substantially less than both its height and the depth of the base, whereby the flange becomes the front facing for the sidewalk slab.

4. The combination of a gutter drain basin, a sidewalk slab and an inlet casting, said inlet casting comprising a base, end walls extending upwardly from the ends of and transversely of the length of the base to form the end walls of the casting, the outer faces of said end walls forming the end faces of the casting, spaced apart partition walls extending upwardly from the bases transversely of its length to define a plurality of passageways intermediate the end walls to drain water from the road gutter into the basin beneath the sidewalk, a flange extending upwardly from and connecting said partition and end walls, the height of the flange being substantially greater than the thickness of the base, the front faces of the partition and end walls and the base being in a common plane and defining the front face of the casting, vertical lugs extending laterally outwardly from the end faces of the casting, the lugs being located to the rear of and below said flange and above the base, and a gutter drain basin below the casting and having its top at a level intermediate the top and bottom of the lugs and the sidewalk slabs poured thereabove to the level of the top of the gutter drain basin.

5. *In a road drainage catch basin, in combination, a pair of side walls defining the lateral limits of the catch basin, a front wall presenting its upper edge substantially level with the road sub-grade, a sidewalk slab integral with said side walls to cover the catch basin, and a curb inlet casting having a base which is disposed at the upper edge of said front wall of the catch basin and a pair of end walls the lower portions of which are disposed at the inner surface of the side walls of the catch basin and the upper portions of which are disposed within said sidewalk slab, said casting having a pair of protuberances extending outwardly and generally longitudinally from both said end walls of the casting, said protuberances having a vertical dimension substantially centered at the juncture of said side walls and sidewalk slab of the catch basin with the lower portion thereof embedded in said side walls of the catch basin and with the upper portion thereof embedded in said sidewalk slab, whereby said side walls of the catch basin together with its said front wall and said sidewalk slab are united and bonded by said protuberances of the curb inlet casting to prevent a differential in the*

*expansion and contraction of said side and front walls and said sidewalk slab of the catch basin and to prevent movement of the curb inlet casting relative to said walls and slab of the catch basin.*

6. *The combination according to claim 5 wherein said vertical dimension of said pair of protuberances is its major dimension so that an increased surface is presented in a vertical plane through the longitudinal axis of the casting and normal to the direction of expansion and contraction of the side walls and sidewalk slab of the catch basin and to the direction of possible outward movement of the curb inlet casting.*

DE WITT SAXTON CROCKER.

REFERENCES CITED

The following references are of record in the file of this patent or the original patent:

UNITED STATES PATENTS

| Number | Name | Date |
|---|---|---|
| 459,259 | Shunk | Sept. 8, 1891 |
| 634,011 | Mahony | Oct. 3, 1899 |
| 1,654,246 | Egan | Dec. 27, 1927 |
| 2,242,192 | Gordon | May 13, 1941 |